(12) United States Patent
Li et al.

(10) Patent No.: US 11,384,593 B2
(45) Date of Patent: *Jul. 12, 2022

(54) INDUCTION-HEATING WELDING METHOD FOR VACUUM INSULATED GLASS

(71) Applicant: LUOYANG LANDGLASS TECHNOLOGY CO., LTD., Luoyang (CN)

(72) Inventors: Yanbing Li, Luoyang (CN); Zhangsheng Wang, Luoyang (CN)

(73) Assignee: Luoyang Landglass Technology Co., Ltd., Luoyang (CN)

( * ) Notice: Subject to any disclaimer, the term of this patent is extended or adjusted under 35 U.S.C. 154(b) by 268 days.

This patent is subject to a terminal disclaimer.

(21) Appl. No.: 16/607,182

(22) PCT Filed: Apr. 4, 2018

(86) PCT No.: PCT/CN2018/081812
§ 371 (c)(1),
(2) Date: Oct. 22, 2019

(87) PCT Pub. No.: WO2018/196570
PCT Pub. Date: Nov. 1, 2018

(65) Prior Publication Data
US 2020/0384559 A1 Dec. 10, 2020

(30) Foreign Application Priority Data
Apr. 26, 2017 (CN) .......................... 201710282659.4

(51) Int. Cl.
*B23K 1/00* (2006.01)
*B23K 1/002* (2006.01)
(Continued)

(52) U.S. Cl.
CPC ............ *E06B 3/6612* (2013.01); *B23K 1/002* (2013.01); *B23K 1/0008* (2013.01); *B23K 1/19* (2013.01);
(Continued)

(58) Field of Classification Search
CPC ............ E06B 3/66357; E06B 3/67334; E06B 3/6612; B23K 1/0008; B23K 1/002;
(Continued)

(56) References Cited

U.S. PATENT DOCUMENTS 2,235,680 A * 3/1941 Haven ................. E06B 3/66357
428/34
5,985,069 A 11/1999 Kawabe et al.
(Continued)

FOREIGN PATENT DOCUMENTS

| CN | 102079619 A | 6/2011 |
| CN | 106277850 A | 1/2017 |
| CN | 107417140 A | 12/2017 |

OTHER PUBLICATIONS

International Search Report dated Jun. 27, 2018, issued in corresponding International Patent Application No. PCT/CN2018/081812.

*Primary Examiner* — Maria V Ewald
*Assistant Examiner* — Ethan Weydemeyer
(74) *Attorney, Agent, or Firm* — Morgan, Lewis & Bockius LLP (57) ABSTRACT

An induction-heating welding method for vacuum insulated glass comprising upper and lower glass substrates is disclosed. Metal layers are prepared in regions to be sealed for the upper and lower glass substrates. A continuous solder is distributed on the metal layer in the lower glass substrate's region to be sealed. The upper and lower glass substrates are superposed. During welding, a high-frequency induction (Continued)

welding head's center moves forward along a centerline of a width of the metal layers; during induction heating of the metal layers in a corner region, a relative position between a movement route of the high-frequency induction welding head's center and the centerline of the width of the metal layers is changed, so that the movement route deviates from the centerline of the width of the metal layers, and thus reducing induction power and avoiding overheating of the metal layers in the corner region.

8 Claims, 6 Drawing Sheets

(51) Int. Cl.
  *B23K 1/19* (2006.01)
  *E06B 3/66* (2006.01)
  *E06B 3/663* (2006.01)
  *E06B 3/673* (2006.01)
  *C03C 27/10* (2006.01)
  *B23K 103/00* (2006.01)
  *C03C 27/08* (2006.01)

(52) U.S. Cl.
  CPC .......... *C03C 27/10* (2013.01); *E06B 3/66357* (2013.01); *B23K 2103/54* (2018.08); *C03C 27/08* (2013.01); *E06B 3/67334* (2013.01); *E06B 2003/66338* (2013.01)

(58) Field of Classification Search
  CPC ........... B23K 1/19; C03C 27/10; C03C 27/02; C03C 27/04; C03C 27/08; Y02B 80/22; Y02A 30/249
  See application file for complete search history.

(56) References Cited

U.S. PATENT DOCUMENTS

2014/0216645 A1  8/2014  Nakamura
2020/0378177 A1* 12/2020  Li ........................ B23K 1/002

* cited by examiner

INDUCTION-HEATING WELDING METHOD FOR VACUUM INSULATED GLASS

CLAIMS FOR PRIORITY

This application is a U.S. national phase entry under 35 U.S.C. § 371 from PCT International Application No. PCT/CN2018/081812 filed on Apr. 4, 2018, which is based upon and claims the benefit of priority from the prior Chinese Patent Application No. 201710282659.4 filed on Apr. 26, 2017. The entire contents of the above applications are incorporated herein by reference.

BACKGROUND

Technical Field

The present disclosure relates to the technical field of vacuum insulated glass, and in particular to an induction-heating welding method for vacuum insulated glass.

Background

Vacuum insulated glass is an emerging category of glass, and is generally composed of two pieces of glass, between which is a vacuum layer. Due to the existence of this vacuum layer, vacuum insulated glass has good performance in sound insulation, thermal insulation and condensation resistance, and is more in line with the national development requirements for energy conservation and environmental protection.

The sealing quality of vacuum insulated glass directly affects the performance of vacuum insulated glass. At present, the sealing of vacuum insulated glass mainly adopts two methods: one is sealing with low-melting-point glass powder, and the other is sealing with metal. When the metal is used for sealing, metal layers are firstly prepared at the edge portions of the facing surfaces of the two glass substrates, and then a brazing process is used to firmly connect the metal layers with the solder, thereby achieving airtight sealing of the two glass substrates.

Figure 1:
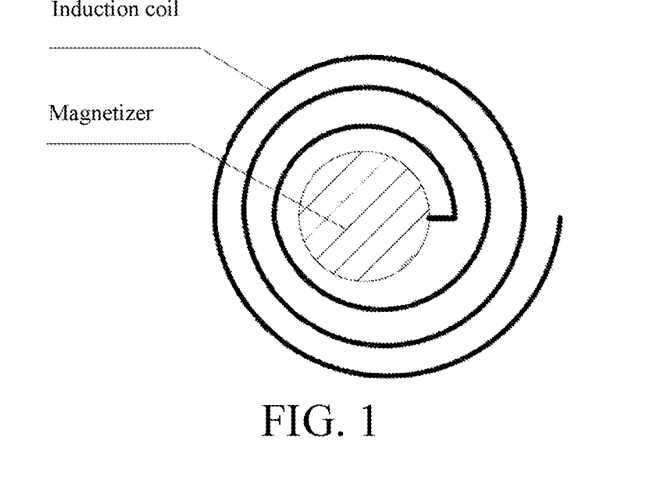
FIG. 1 is a schematic view of an exemplary embodiment of high-frequency induction welding head.

In the sealing process, a brazing solder can be heated by the high-frequency induction heating, and a high-frequency induction welding head is formed by coiling a high-frequency induction coil, as shown in FIG. 1. In a welding process, a centerline of the high-frequency induction welding head is aligned with a centerline of a welding strip, and the high-frequency induction welding head moves forward at a uniform speed along the centerline of the welding strip, thereby achieving airtight welding around the vacuum insulated glass.

Figure 2:
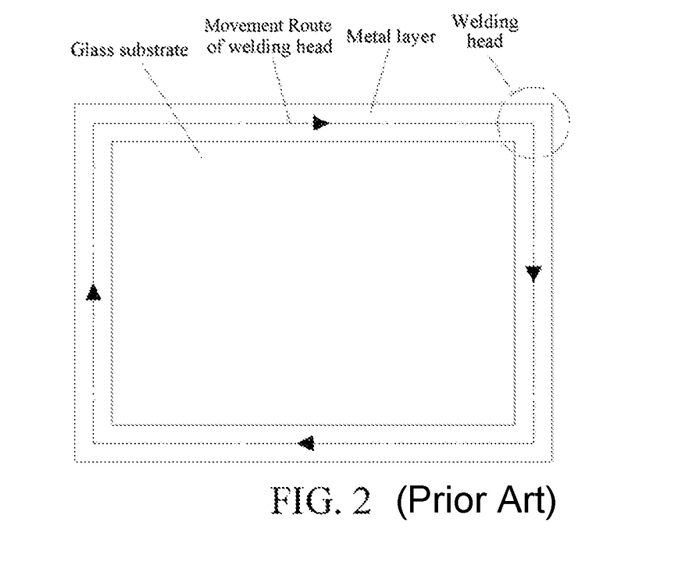
FIG. 2 is a schematic view of induction heating welding in the prior art.

Since the solder and the metal layers coexist in the sealing region, in addition to heating the solder, the high-frequency induction welding head also heats the metal layers in the sealing region during the operation. In the actual production process, it is found that the glass substrate often has an over-burning phenomenon in the corner regions of metal layers, referring to the position of the high-frequency induction welding head in FIG. 2, so that the bonding strength between the metal layers and the glass substrate is greatly reduced. For example, when the metal layers are silver film layers sintered on the glass substrates, the silver in the silver films in the corner regions of the glass substrates is fused into the brazing solder with overheating, so that the welding strength of the produced vacuum insulated glass at the corner regions is greatly reduced, thereby affecting the welding reliability and service life of the vacuum insulated glass.

SUMMARY

In view of the problem that the induction-heating welding in conventional technologies results in the reduction in the welding strength at the corner of the vacuum insulated glass, the inventors have found through research that: a high-frequency induction welding head necessarily has a deceleration-redirection-acceleration process in a corner region; therefore, the induction heating time of the internal corner portion of the corner region of the vacuum insulated glass is too long, and a heating speed of the edge of the metal layer in the heating process is significantly greater than that of the center of the metal layer. This is a main cause for over-burning of the metal layer in the corner region; and the over-burning of the internal corner portions of the corner regions is especially serious. The inventors have also found through research that, in theory, the above problem may be solved by reducing the power of induction heating, increasing a moving speed of the high-frequency induction welding head, and changing a distance between the high-frequency induction welding head and the metal layers. In the actual implementation process, it is found that the above-mentioned means has low operability, and has certain but not obvious effects.

The present disclosure aims to provide induction-heating welding methods for vacuum insulated glass. For example, the relative position between a movement route of a center of the high-frequency induction welding head and a centerline of a width of metal layers is changed, so that the movement route of the high-frequency induction welding head's center deviates from the centerline of the width of the metal layers, and thus induction power of the metal layers in corner regions is reduced, thereby avoiding the over-burning phenomenon of the metal layers in the corner regions. The corner region is defined as follows: a region where a centerline of a width of the metal layer changes a direction is a corner region.

In order to achieve the above objectives, the present disclosure adopts the following technical solutions:

An induction-heating welding method for vacuum insulated glass is provided. The vacuum insulated glass comprises an upper glass substrate and a lower glass substrate. A metal layer is prepared in the upper glass substrate's region to be sealed and the lower glass substrate's region to be sealed, respectively. A continuous solder is distributed on the metal layer in the lower glass substrate's region to be sealed. The upper and lower glass substrates are superposed. During welding, a high-frequency induction welding head's center moves forward along a centerline of a width of the metal layers; during induction heating of corner regions of the metal layers, a relative position between a movement route of the center of the high-frequency induction welding head and the centerline of the width of the metal layer is changed, so that the movement route of the high-frequency induction welding head's center deviates from the centerline of the width of the metal layers, and thus reducing the induction power of the metal layers in the corner regions and avoiding overheating of the metal layers in the corner regions.

Further, a manner of changing the relative position between a movement route of the center of the high-frequency induction welding head and the centerline of the width of the metal layer is that: the movement route of the center of the high-frequency induction welding head in the corner regions is located at an outer side of the centerline of the width of the metal layer.

Further, another manner of changing the relative position between a movement route of the center of the high-frequency induction welding head and the centerline of the width of the metal layer is that: changing a shape of the metal layers such that an inner edge and an outer edge of the metal layers in the corner regions are both arc-shaped.

Further, an arc radius of the inner edge of the metal layers in the corner regions is r, an arc radius of the outer edge of the metal layers in the corner regions is R, a width of a straight segment of the metal layers is d, and d=R−r.

Further, the width of the metal layers is about 8 mm, the arc radius of the inner edge of the metal layers in the corner regions is about 3 mm, and the arc radius of the outer edge of the metal layers in the corner regions is about 11 mm.

Further, when a surface of a glass substrate is in a shape of a circle, the metal layer disposed in the glass substrate's region to be sealed is in a shape of a circular ring, a width of the circular ring is d, a radius of the inner circle of the circular ring is r, the movement route of the center of the high-frequency induction welding head is a circle concentric with the circular ring, a radius of the circle formed by the movement route is R', and r+d/2<R'<r+d.

Further, the relative position between the movement route of the center of the high-frequency induction welding head and the centerline of the width of the metal layers is changed, so that a distance of the movement route of the high-frequency induction welding head's center deviating from the centerline of the width of the metal layers is less than a half of the width of the metal layers.

According to the above methods, the relative position of the movement route of the center of the high-frequency induction welding head and the centerline of the width of the metal layers is changed, so that the movement route of the center of the high-frequency induction welding head deviates from the centerline of the width of the metal layers, and thus reducing the induction power of the metal layers in the corner regions and avoiding the over-burning of the metal layers. For the vacuum insulated glass obtained according to the present disclosures, the sealing performance of the sealing regions is improved, the qualification rate of the product is increased, and the service life of the vacuum insulated glass is prolonged.

In the figures, 1 denotes a glass substrate, 2 denotes a metal layer, 21 denotes an outer edge of the metal layer in a corner region, 22 denotes an inner edge of the metal layer in a corner region, 23 denotes a centerline of a width of the metal layer, 3 denotes a high-frequency induction welding head, 4 denotes a movement route of the high-frequency induction welding head.

DETAILED DESCRIPTION

The present disclosure is described below in a more comprehensive manner through embodiments. The present invention may be embodied in various forms, and should not be limited to the exemplary embodiments described herein.

For ease of description, spatially relative terms such as "above", "below", "left", and "right" may be used herein to describe a relationship between one element or feature and another element or feature shown in the figure. It should be understood that such spatially relative terms are intended to encompass different orientations of the device in use or operation in addition to the orientation depicted in the figures. For example, if the device in the figure is turned over, an element or feature described as being "below" and another element or feature will be "above" the other element or feature. Therefore, the exemplary term "below" may encompass both the above and below orientations. The device may also be oriented in other ways (for example, rotated 90 degrees or at other orientations), and the spatially relative terms used herein can be interpreted accordingly.

Embodiment 1

Figure 3:
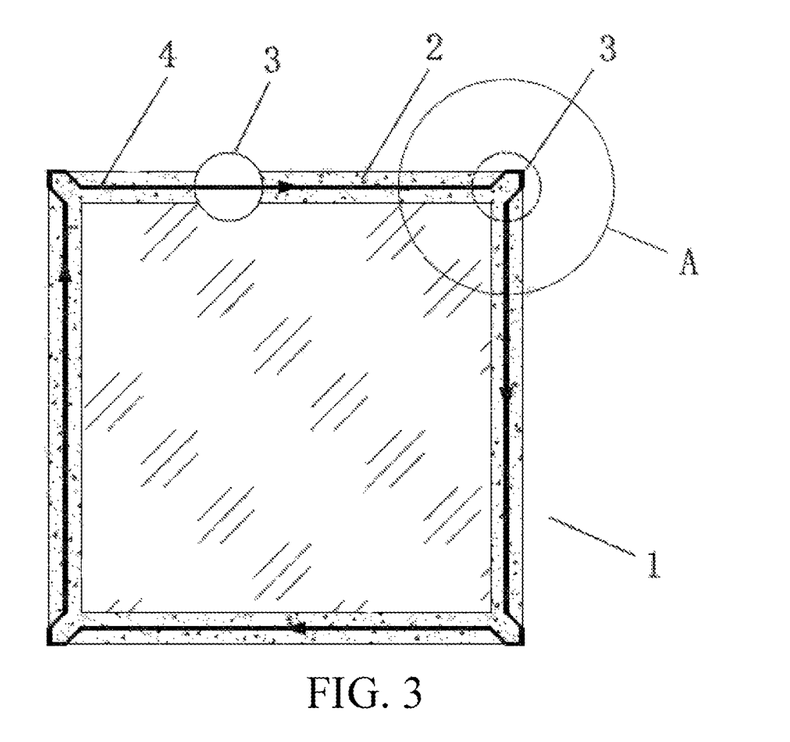
FIG. 3 is a schematic view of welding of an exemplary embodiment 1.
Figure 4:
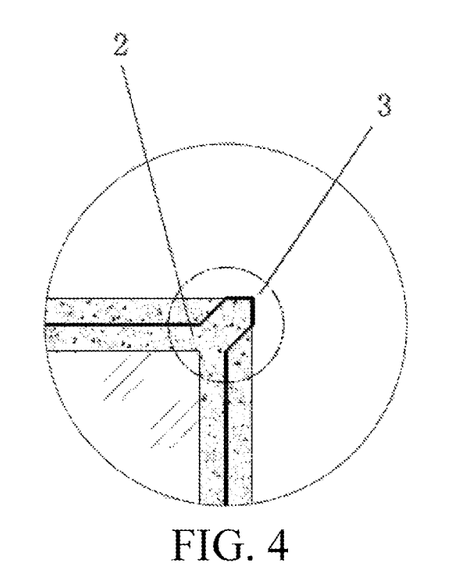
FIG. 4 is an enlarged schematic view of Region A in FIG. 3.

FIG. 3 and FIG. 4 show a first exemplary embodiment of an induction-heating welding method for vacuum insulated glass according to the present disclosure. In this embodiment, a glass substrate 1 to be sealed is a glass having a square surface, a metal layer 2 is previously disposed in a sealing region around the glass substrate 1, an inner edge and an outer edge of the metal layer 2 in each of the 4 corner regions are right-angled, and a continuous solder is distributed on the metal layer 2. During welding of a straight segment of the metal layer 2, a high-frequency induction welding head 3 moves forward at a uniform speed while a center of the high-frequency induction welding head 3 is aligned with a centerline of a width of the metal layer 2, and a movement route 4 thereof is a straight line. During welding of a corner region of the metal layer 2, the movement route 4 of the high-frequency induction welding head 3 is offset to an outer side, so that the center of the high-frequency induction welding head 3 deviates from the centerline of the width of the metal layer 2 in the moving process, and thus reducing the induction power of the metal layer 2 in the corner region. The deviation distance should be less than a half of a width of the metal layer 2.

Embodiment 2

Figure 5:
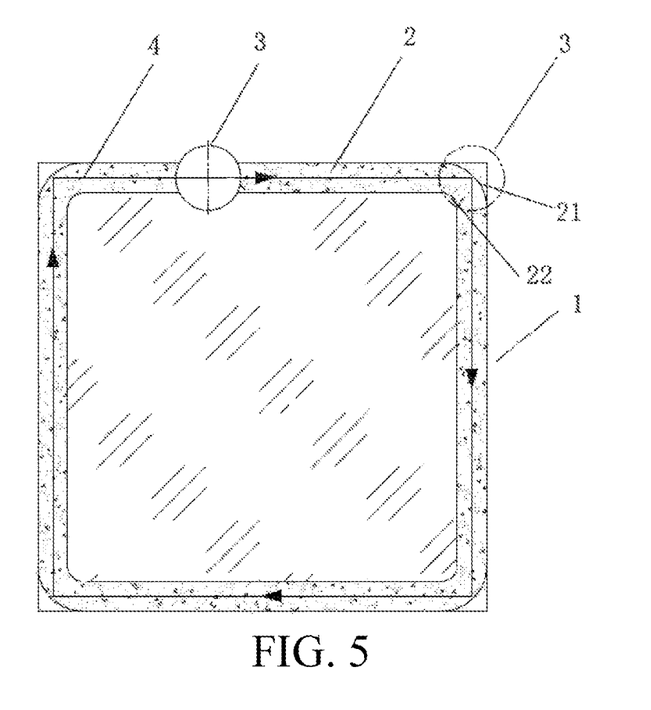
FIG. 5 is a schematic view of welding of an exemplary embodiment 2.

FIG. 5 shows a second exemplary embodiment of an induction-heating welding method for vacuum insulated glass according to the present disclosure. In this embodiment, a glass substrate 1 to be sealed is a glass having a square surface, a metal layer 2 is previously disposed in a sealing region around the glass substrate 1, and a continuous solder is distributed on the metal layer 2. During welding of a straight segment of the metal layer 2, a high-frequency induction welding head 3 moves forward at a uniform speed while a center of the high-frequency induction welding head 3 is aligned with a centerline of a width of the metal layer 2, and the movement route 4 thereof is a straight line. During welding of a corner region of the metal layer 2, the movement route of the high-frequency induction welding head 3 is kept unchanged. As shown in FIG. 5, the sides of the closed pattern are formed by connecting centerlines of the width of the metal layer 2 when the centerlines intersect. By changing a shape of the metal layer 2 in a corner region, an outer edge 21 and an inner edge 22 of the metal layer in the corner region are arc-shaped, so that a center of the high-frequency induction welding head 3 deviates outwardly from the centerline of the metal layer 2 in the moving process, and thus reducing the induction power of the metal layer 2 in the corner region. The deviation distance should be less than a half of a width of the metal layer 2. The width of the metal layer is preferably about 8 mm, an arc radius of the inner edge of the metal layer in the corner region is preferably about 3 mm, and an arc radius of the outer edge of the metal layer in the corner region is preferably about 11 mm.

Embodiment 3

Figure 6:
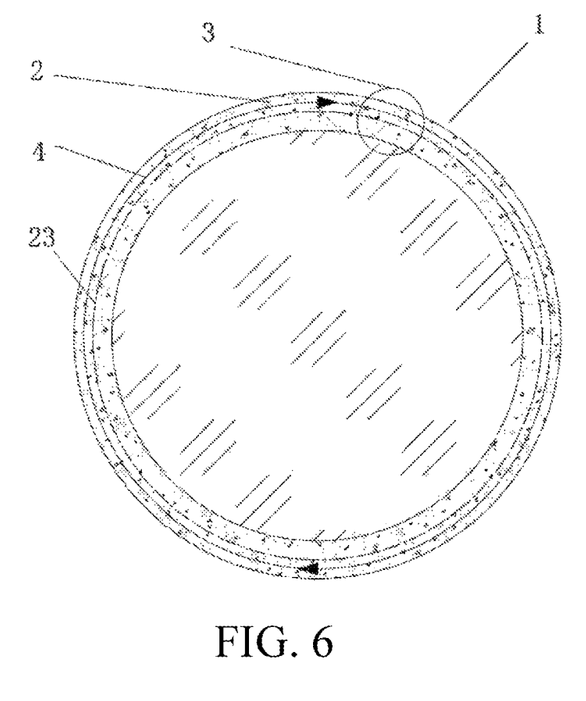
FIG. 6 is a schematic view of welding of an exemplary embodiment 3.

FIG. 6 shows a third exemplary embodiment of an induction-heating welding method for vacuum insulated glass according to the present disclosure. In this embodiment, a surface of a glass substrate 1 to be sealed is in a shape of a circle, a metal layer 2 in a shape of a circular ring is previously disposed in a sealing region around the glass substrate 1, a width of the circular ring is d, and a radius of an inner circle of the circular ring is r. The metal layer 2 in this embodiment has no straight segment, but is all corner regions. A welding method for the corner regions is substantially the same as that described in Embodiment 1. The movement route 4 of the high-frequency induction welding head 3 is offset to an outer side, so that a centerline of the high-frequency induction welding head 3 deviates from a centerline 23 of a width of the metal layer 2 in the moving process, and thus reducing the induction power of the metal layer 2 in the corner regions . The movement route of the high-frequency induction welding head 3's center is a circle concentric with the circular ring-shaped metal layer 2, the radius of the circle formed by the movement route is R', and r+d/2<R'<r+d.

Embodiment 4

Figure 7:
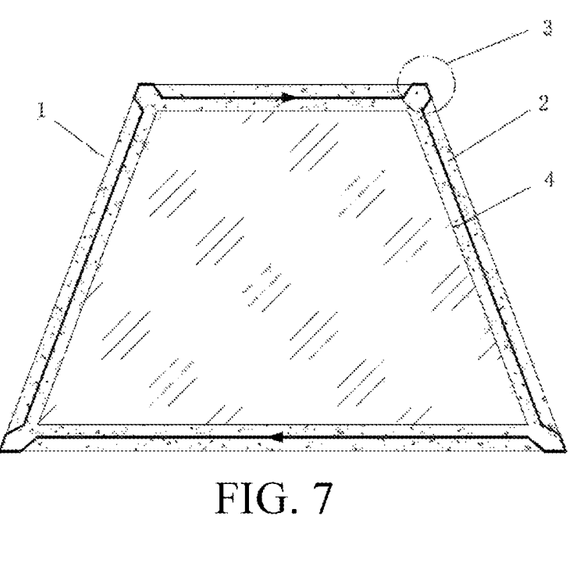
FIG. 7 is a schematic view of welding of an exemplary embodiment 4.

FIG. 7 shows a fourth exemplary embodiment of an induction-heating welding method for vacuum insulated glass according to the present disclosure. The welding manner is substantially the same as that described in Embodiment 1, except that a surface of a glass substrate 1 in this embodiment is in the shape of a trapezoid.

Embodiment 5

Figure 8:
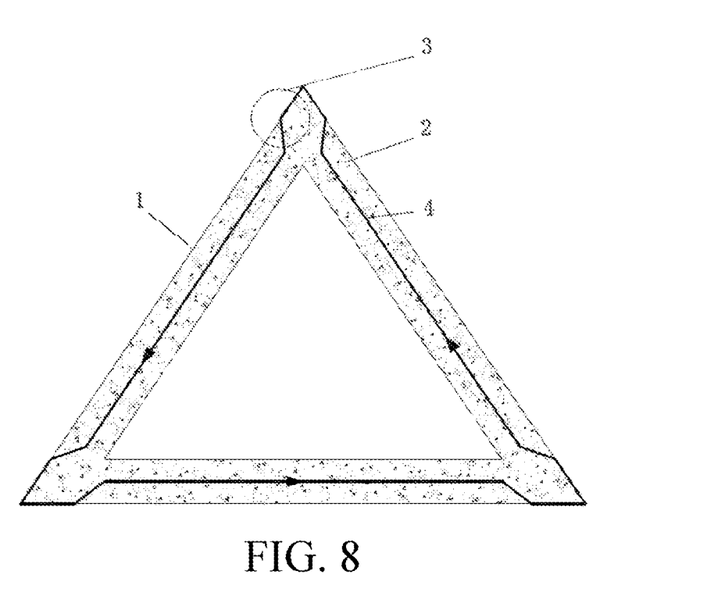
FIG. 8 is a schematic view of welding of an exemplary embodiment 5.

FIG. 8 shows a fifth exemplary embodiment of an induction-heating welding method for vacuum insulated glass according to the present disclosure. The welding manner is substantially the same as that described in Embodiment 1, except that the surface of the glass substrate 1 in this embodiment is in the shape of a triangle.

Although several preferred embodiments of this application have been described above with reference to the accompanying drawings, this application is not limited thereto. Any improvement and/or variation made by a person of ordinary skill in the art without departing from the spirit of this application shall fall within the protection scope of this application.

What is claimed is:

1. An induction-heating welding method for a vacuum insulated glass, wherein the vacuum insulated glass comprises an upper glass substrate and a lower glass substrate, comprising:
    preparing a metal layer in the upper glass substrate's region to be sealed and in the lower glass substrate's region to be sealed, respectively;
    distributing a continuous solder on the metal layer in the lower glass substrate's region to be sealed;
    superposing the upper glass substrate and the lower glass substrate; and
    performing induction-heating welding on the vacuum insulated glass's regions to be sealed, a center of a high-frequency induction welding head moving forward along a centerline of a width of the metal layers during welding,
    wherein:
        during induction heating of a corner region of the metal layers, changing a relative position between a movement route of a center of the high-frequency induction welding head and the centerline of the width of the metal layers, and
        deviating the movement route of the center of the high-frequency induction welding head from the centerline of the width of the metal layers, thereby reducing induction power and avoiding overheating of the metal layers in the corner regions.

2. The induction-heating welding method according to claim 1, wherein changing the relative position between the movement route of the center of the high-frequency induction welding head and the centerline of the width of the metal layers comprises:
    placing the movement route of the center of the high-frequency induction welding head in the corner regions in an outer side of the centerline of the width of the metal layers.

3. The induction-heating welding method according to claim 1, wherein changing the relative position between the movement route of the center of the high-frequency induction welding head and the centerline of the width of the metal layers comprises:
    changing a shape of the metal layers such that an inner edge and an outer edge of the metal layers in the corner region are arc-shaped.

4. The induction-heating welding method according to claim 3, wherein an arc radius of the inner edge of the metal layer in the corner region is r, an arc radius of the outer edge of the metal layer in the corner region is R, a width of a straight segment of the metal layer is d, and d=R-r.

5. The induction-heating welding method according to claim 4, wherein the width of the straight segment of the metal layers is about 8 mm, the arc radius of the inner edge of the metal layer in the corner region is about 3 mm, and the arc radius of the outer edge of the metal layer in the corner region is about 11 mm.

6. The induction-heating welding method according to claim 1, wherein a surface of each of the upper and lower glass substrates is in a shape of a circle, the metal layer disposed in each of the upper and lower glass substrates' region to be sealed is in a shape of a circular ring, a width of the circular ring is d, a radius of an inner circle of the circular ring is r, the movement route of the high-frequency induction welding head's center is a circle concentric with the circular ring, a radius of the circle formed by the movement route is R', and r+d/2<R'<r+d.

7. The induction-heating welding method according to claim 1, wherein changing the relative position between the movement route of the center of the high-frequency induction welding head and the centerline of the width of the metal layers, so that a distance of the movement route of the center of the high-frequency induction welding head deviating from the centerline of the width of the metal layers is less than a half of the width of the metal layers.

8. A vacuum insulated glass product, comprising:
an upper glass substrate and a lower glass substrate;
a metal layer in each of the upper and lower glass substrates; and
a continuous solder on the metal layer of the lower glass substrate,
wherein induction-heating welding on the metal layers is performed according to any of the above method claims.

* * * * *